(12) United States Patent
Troia et al.

(10) Patent No.: US 10,409,585 B2
(45) Date of Patent: Sep. 10, 2019

(54) OVER-THE-AIR (OTA) UPDATE FOR FIRMWARE OF A VEHICLE COMPONENT

(71) Applicant: Micron Technology, Inc., Boise, ID (US)

(72) Inventors: Alberto Troia, Munich (DE); Robert Richard Noel Bielby, Placerville, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 15/896,899

(22) Filed: Feb. 14, 2018

(65) Prior Publication Data

US 2019/0250900 A1  Aug. 15, 2019

(51) Int. Cl.
```
G06F 8/65        (2018.01)
G06F 21/57       (2013.01)
H04L 29/08       (2006.01)
H04L 29/06       (2006.01)
H04L 9/32        (2006.01)
```
(52) U.S. Cl.
CPC .............. *G06F 8/65* (2013.01); *G06F 21/572* (2013.01); *H04L 9/3242* (2013.01); *H04L 63/08* (2013.01); *H04L 67/12* (2013.01); *H04L 67/34* (2013.01)

(58) Field of Classification Search
CPC ....... H04L 63/08; H04L 67/12; H04L 9/3242; H04L 67/34; G06F 8/65; G06F 21/572
See application file for complete search history.

(56) References Cited

U.S. PATENT DOCUMENTS

| | | | |
|---|---|---|---|
| 9,298,649 B2 | 3/2016 | Pandya et al. | |
| 2004/0098715 A1* | 5/2004 | Aghera | G06F 8/65 717/173 |
| 2011/0010543 A1* | 1/2011 | Schmidt | H04W 12/10 713/168 |
| 2015/0113520 A1* | 4/2015 | Kotani | G06F 8/654 717/172 |
| 2017/0123784 A1 | 5/2017 | Zymeri et al. | |
| 2017/0242679 A1 | 8/2017 | Sangameswaran et al. | |

* cited by examiner

*Primary Examiner* — Wei Y Zhen
*Assistant Examiner* — Amir Soltanzadeh
(74) *Attorney, Agent, or Firm* — Greenberg Traurig, LLP

(57) ABSTRACT

Executable code is part of an over-the-air (OTA) update received by, for example, a computing device in a vehicle. In one example, the update is a secure over-the-air (SOTA) update of software that is stored in firmware of a vehicle component (e.g., firmware stored in memory of a storage device or a boot device that are mounted in a vehicle).

19 Claims, 10 Drawing Sheets

OVER-THE-AIR (OTA) UPDATE FOR FIRMWARE OF A VEHICLE COMPONENT

RELATED APPLICATIONS

This application is related to U.S. Non-Provisional application Ser. No. 15/879,787, filed 25 Jan. 2018, entitled "Certifying Authenticity of Stored Code and Code Updates," by Salvatore Fava et al., the entire contents of which application is incorporated by reference as if fully set forth herein.

FIELD OF THE TECHNOLOGY

At least some embodiments disclosed herein relate to wireless transmission of software updates (e.g., secure over-the-air (SOTA) software updates) in general, and more particularly, but not limited to, configuring a component of a vehicle using an OTA firmware update that is sent to the vehicle.

BACKGROUND

Vehicle telematics systems provide advanced interaction and communication capabilities for vehicles. They are one of a class of computer-based technologies that have recently been added to vehicles to improve the driving experience. Various systems, both telematics systems and other systems, commonly include a variety of software and/or hardware. Like many other computing systems, software may occasionally be updated to improve functionality and operability.

In some cases, software updates come in the form of user-implemented updates, which are done via a local network or through the insertion of a memory stick into the vehicle. Dealers may also update vehicle modules when a vehicle is brought in for servicing.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
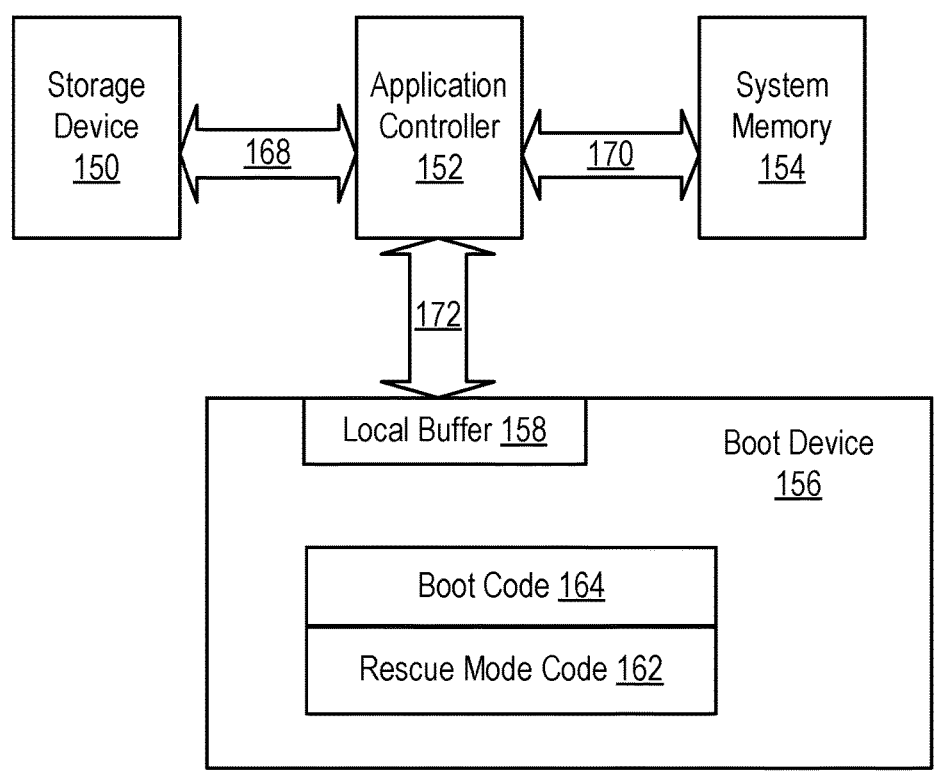
FIG. 1 shows a system for a vehicle including a storage device and a boot device, wherein the storage device and/or the boot device can be configured by an OTA update, according to one embodiment.

In various embodiments described below, a wireless transmission is used to update software (e.g., firmware) for one or more components of a vehicle. The vehicle can be, for example, an autonomous vehicle, a drone, a truck, etc. In various examples, the components updated can be microprocessors, infotainment centers, assisted driving systems, and chipsets or other computing devices that collect and process data regarding the environment of an autonomous vehicle and/or other data used during operation of the vehicle.

In one example, an OTA update is used provide updated data to an artificial intelligence system. The updated data is used to improve the performance of the AI system (e.g., detection of certain types of objects can be improved based on updated data). In another example, a GPS positioning system uses data regarding high definition maps used in navigation. OTA updates can be used to update firmware and/or other software to improve real-time performance of the GPS positioning system (e.g., so that a vehicle can avoid road construction and/or other adverse road conditions in real-time).

In some embodiments, the updates via the wireless transmission can be, for example, over-the-air (OTA) updates. In other embodiments, other forms of wireless transmission can be used, including for example Wi-Fi. In some embodiments, the updated software is firmware stored in memory of a vehicle component.

In some embodiments, a secure over-the-air (SOTA) software update is used. For example, a component of a vehicle can be configured using an SOTA firmware update that is sent to the vehicle over a wireless communication interface.

In some embodiments, systems and methods are provided for determining whether to accept or reject an OTA update (e.g., based on determining whether the update is authentic). In some embodiments, the OTA update is executable code to update a computer program stored in system memory. In other embodiments, the update is made to firmware stored in a storage device or a boot device. In yet other embodiments, the update is executable code received by an application controller of a vehicle. In one example, the update may be a secure over-the-air (SOTA) update of software that is used to update executable code stored in system memory and/or update firmware of the application controller and/or a peripheral computing device (e.g., a storage device).

One aspect of the present embodiments includes the realization that components of a vehicle often need re-configuration for various reasons. The re-configuration may be required, for example, to fix software errors that were incorporated into firmware of an original hardware component (e.g., a controller for a LIDAR system, a navigation system, an infotainment system, etc.) at the time of manufacture of a vehicle incorporating the hardware component.

In other cases, for example, software of a component in a vehicle can become corrupted after manufacture. In one example, the software can become compromised based on introduction by malware of a hacker. The failure to update the component could create a potentially dangerous situation (e.g., malware introduced into an autonomous vehicle could cause the vehicle to crash and/or cause injury to persons or property).

The present embodiments solve the problem of updating vehicle components by sending an update via wireless transmission to a vehicle including the component, and then updating a configuration of the component based on software received in the update. In some cases, the authenticity of the update is determined based on a cryptographic measurement associated with the software received in the update. In response to determining the authenticity of the update, the received software can be, for example, accepted or rejected.

If the update is accepted, then the application controller can proceed to use the update. For example, the application controller can proceed to execute software code that includes the update and/or store the update as part of updated firmware.

In another example, the update is firmware that is executed during a boot process. If the update is accepted, then the application controller completes the boot process and begins normal operation (e.g., this normal operation can include execution of one or more computer programs stored in system memory that are re-configured using the update).

If the update is rejected, then the application controller can avoid using the update. In some embodiments, the application controller can, for example, enter a rescue mode in which the application controller reboots and/or issues a new request for another update of software. In some examples, the update of software is used to replace software that was previously-stored in system memory of the application controller. In one example, the previously-stored software is erased from system memory and new software is written to the system memory based on the newly-received update.

In one embodiment, it is desired that all devices or components of a vehicle have a mechanism to ensure that an unauthorized change in firmware of a component in the vehicle is recognized and/or fixed (e.g., using updated code coming from an authentic source that is received by wireless transmission). The failure to detect an unauthorized change may lead to a dangerous or destructive unauthorized function or operation of one or more of the components. The present embodiments solve this problem by determining a cryptographic measurement for newly-received software (e.g., run-time code or firmware stored in a component of the platform) and use the cryptographic measurement to determine whether the software has been altered in an unauthorized way. In response to this determination, the software can be, for example, accepted or rejected.

In some cases, a system-on-chip mechanism may help in securing content of one or more memories containing firmware. However, in some cases, the system-on-chip operation is improved by authenticating data stored in a storage device that is accessed during operation of the system-on-chip. In other cases, operation of a hypervisor or virtual machine is improved by ensuring the data sent to memory devices is secured and authentic.

In some cases, a platform configuration is implemented without a hardware security module. During the boot, code is moved from a boot device and a storage device to an application controller. The application controller moves the code into system memory. For example, the content stored in the system memory is obtained by unpacking the code removed from the boot device. This unpacking is performed by the application controller.

After booting, the application controller starts to operate. However, it is realized that the boot code or run-time code may present a security risk. For example, memory of the boot device contains firmware. A firmware digest can be modified or replaced by using a replay attack (communications among devices are not authenticated). As another example, in case of a boot device replacement, the system can become vulnerable because digest values are hacked, thus making the whole system vulnerable. In another example, in a secure over-the-air update, there may be no certified source of firmware.

In other cases, a platform configuration is implemented with a hardware security module (HSM) in the application controller. During the boot process, code is moved from the boot device in the storage device to the application controller. The HSM checks integrity of the code and, if the content is determined to be secure, the code is moved inside the system memory (e.g., the code is written to the system memory by the application controller). Then, the application controller starts to operate, using the HSM to validate subsequent code modifications in the system memory, and/or in the boot or storage memories (e.g., memories in one or more storage devices).

In order to improve the above platform configurations, various embodiments described herein perform an SOTA update of firmware and determine a cryptographic measurement of the update. In one embodiment, a secure over-the-air (SOTA) update is performed using a component with a cryptographic engine.

In another example, an over-the-air update is downloaded and verified locally in the hardware of an application before being accepted. This update permits identifying the developer of the system. The update can also implement an anti-replay mechanism.

In another example, a system can be configured to run a rescue mode to ask for a new release of firmware by an OTA update. The rescue mode may be entered, for example, in response to rejecting a prior OTA update based on a cryptographic measurement of the prior update.

FIG. 1 shows a system of a vehicle that includes a storage device 150 and a boot device 156. The storage device 150 and/or the boot device 156 can be configured by an OTA update (e.g., based on a firmware update), according to one embodiment. The update can be firmware received, for example, into non-volatile memory of storage device 150 or boot device 156.

In one embodiment, the firmware is received by a wireless interface (not shown) of application controller 152. A cryptographic measurement of the update is determined (e.g., by application controller 152), and the received update is sent to a local buffer 158 of boot device 156. The update can be used to configure, for example, boot code 164. In one example, local buffer 158 is a cache memory, typically volatile, used to store temporary data.

The boot code 164 can be executed by boot device 156 and/or loaded to application controller 152 during a boot process. For example, this boot process is performed prior to determining a cryptographic measurement of an OTA update.

If determination of a cryptographic measurement of an OTA update results in a rejection of the data, then application controller 152 can be forced into a rescue mode. Rescue mode code 162 may be used to execute at least a portion of the rescue mode. Rescue mode code 162 may be executed by boot device 156 and/or application controller 152 during the rescue mode.

Various types of applications can be controlled and/or supported by application controller 152. Examples of such applications include a cluster, an entertainment or infotainment system, a seat control of vehicle, and a powertrain system of a vehicle.

In one embodiment, a cryptographic engine (not shown) determines a cryptographic measurement of the update. The cryptographic engine uses this measurement to determine the authenticity of the data. The cryptographic engine determines, for example, whether to accept or reject the data. In response to this determination, various actions can be performed, such as for example described below. In one example, the cryptographic engine includes one or more processors and memory located on boot device 156.

Data may be transferred between components of the system via interconnects 168, 170, 172, each of which may be, for example, an internal or external data or other bus (e.g., Peripheral Component Interconnect (PCI), PCI eXtended (PCI-X), PCI Express (PCIe)), a communication portion, and/or a computer network.

In one embodiment, one or more of storage device 150, application controller 152, and system memory 154 are portions of a system-on-chip (SOC) device (e.g., all of these components are on the same SOC chip). In one embodiment, boot device 156 may be included as part of the SOC chip. In other embodiments, each of these components may be implemented on separate chips (e.g., mounted on and connected by wiring on a hardware card or other structure).

In one example, application controller 152 is the main MCU running a system (e.g., INTEL corei7 is an application controller of a computer). Various controllers (e.g., memory controller) in the surrounding system serve application controller 152 to execute functions.

In one embodiment, firmware or run-time code is received, via application controller 152, by local buffer 158 from storage device 150 or system memory 154. The determination is made to reject the data based on a cryptographic measurement of the data from the OTA update that is stored in local buffer 158. In response to determining to reject the data, application controller 152 updates at least a portion of data in the system memory 154.

For example, the data updated may be a software program that includes the rejected data. The determination to reject the data may be communicated from the cryptographic engine to application controller 152. In one embodiment, security of firmware or run-time code is checked by determining a cryptographic measurement for the code.

In one example, a page of updated code from an OTA update is received into local buffer 158. In one example, a page has a size of at least 4K bytes.

In one example, if an OTA firmware update is rejected, then the entire firmware or run-time code content corresponding to the update is deemed defective or insecure. In such a case, the firmware or run-time code is, for example, updated by a newly-requested secure over-the-air update.

In one embodiment, the cryptographic measurement is determined by calculating a digest using a message authentication code (MAC). For example, the data for the software update itself and a secret key are inputs for calculating the digest. The secret key can be, for example, stored in memory of boot device 156.

In various examples, the MAC is a mechanism/algorithm to generate a signature. The calculation is based on a secret key. One example of an algorithm behind the MAC is SHA256 (which is not based on a secret key) or HMAC-SHA256 (which is based on a secret key). In modern cryptography, the MAC algorithm itself is not secret (the algorithm is a standard one). Only the key, if present, is secret. The result of the MAC calculus is sometimes known as: DIGEST, HASH, SIGNATURE, MEASURE, etc. The output of the MAC algorithm in this application is typically referred to as a "digest". The MAC is a one-way function. HASH=MAC (Key, Information). Knowing the HASH does not enable one to infer anything about the KEY or Information.

Figure 2:
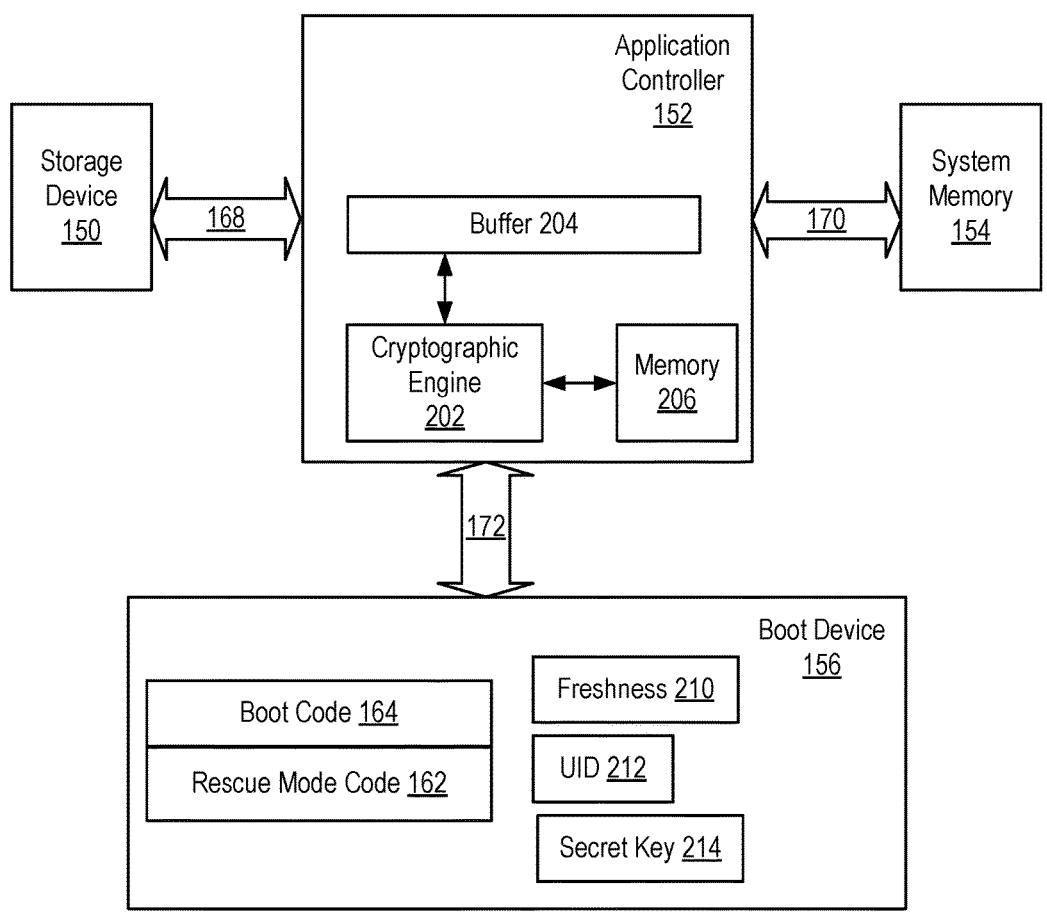
FIG. 2 shows a system for a vehicle, wherein the system determines whether to accept or reject an OTA update for a storage device and/or a boot device based on a cryptographic measurement of the OTA update, according to one embodiment.

FIG. 2 shows a system for a vehicle, wherein the system determines whether to accept or reject an OTA update for storage device 150 and/or boot device 156 (and/or any other component of a vehicle) based on a cryptographic measurement of the OTA update, according to one embodiment. In one embodiment, an OTA update is received, via a wireless interface (not shown) of application controller 152 by buffer 204 as a stream of data portions (e.g., a data portion can be a page or a group of pages).

In one embodiment, in response to cryptographic engine 202 determining to reject a page of the received data, application controller 152 discards software previously-stored in system memory 154 from which the rejected page of data was initially obtained. In response to determining to reject the page of data, cryptographic engine 202 causes application controller 152 to enter or remain in a rescue mode.

In one embodiment, boot device 156 includes a freshness 210, a unique identifier (UID) 212, and a secret key 214 (e.g., stored on-board the boot device 156 in memory). In this embodiment, the application controller 152, before reading and/or using data from boot device 156, verifies the identity of the boot device 156 (e.g., to avoid a need for replacement of the boot device component). In this embodiment, the identity verification is based on the UID 212 stored in the boot device 156. In one example, the UID 212 is provided by the boot device 156 at the request of the application controller 152. The UID 212 is provided together with a signature calculated by the boot device 156 using the secret key 214. For example, this calculation may be done as follows: Signature=(Secret Key, UID | Freshness), where Freshness is a field used for anti-replay (e.g., the Freshness can be a monotonic counter, a time stamp, a NONCE, etc.). In this example, the identity is included in the data read by application controller 152 from the boot device 156, and the identity is verified using the following relationship: Identity proof=UID | Freshness | Signature, where as mentioned above, Freshness is a field used for anti-replay (e.g., the Freshness can be a monotonic counter, a time stamp, a NONCE, etc.)

In one embodiment, the previously-stored software was earlier obtained by an over-the-air update requested by application controller 152. In response to discarding the previously store software, application controller 152 makes a request for a new secure over-the-air update (e.g., from the same or a different source).

In one embodiment, the over-the-air update is received from a computing device such as a server. When the application controller 152 is in a rescue mode, the application controller 152 may load rescue mode code 162 from boot device 156, and use at least a portion of rescue mode code 162 to obtain from the server a new update of the software that was previously rejected.

In one embodiment, the data received by buffer 204 is code obtained from storage device 150. In response to determining to accept the data, application controller 152 copies the data from buffer 204 to system memory 154.

In another embodiment, the data received by buffer 204 is a portion of run-time code stored in system memory 154. In response to determining to accept all portions of data of the run-time code, the run-time code is executed by application controller 152.

In one embodiment, the memory used on boot device 156, storage device 150, and/or system memory 154 can be a non-volatile storage media (e.g., flash memory) and/or volatile memory. This memory may, for example, store the boot code and/or rescue code.

For example, during the boot of an application by application controller 152, the boot code, the operating system (OS), and software code/applications will be moved (in a compressed manner) from the storage device 150 to the system memory 154. Then, this data is uncompressed and execution by application controller 152 begins. When the system is up after the boot, the system memory (e.g., the volatile memory) contains, for example, the entire operating system and all of the software code/applications.

In one embodiment, the boot device 156 has a hardware security module capability and implements the following features: an authenticated command set, protection against replay attacks; a secret key stored inside memory of the boot device 156 (e.g., the secret key is shared with the system developer, which is a source); a cryptographic engine with a built-in, key-based MAC calculator; and a local buffer that can be used for program operations.

In one embodiment, application controller 152 accesses the boot device 156 when performing some or all of its operations. This access involves using the secret keys, algorithms, and authenticated command set above. The command set is protected against replay attack. Application controller 152 may certify the authenticity of data stored in system RAM and/or in storage device 150, and also may certify the authenticity of secure over-the-air updates such as for firmware updates or boot device updates (security firmware).

In one example, the authenticated command set is a set of commands accepted by (or stored in) memory to execute a function (e.g., read/write/erase). The command set is authenticated if there is a mechanism that signs the command and the arguments; in this manner the command is executed if the signature is recognized to belong to an authority (e.g., a known good source).

Various embodiments regarding resident boot code checks are now discussed below. In one embodiment, at power on of a system, application controller 152 receives secure code from memory that is to be executed. Boot device 156 at the factory level contains boot code 164 to start an application of application controller 152, and rescue firmware contained in a resilience block inside memory space of the boot device 156. In one example, rescue mode code 162 is stored in the resilience block. In one example, a resilience block is a special area of memory outside of the addressable space in normal mode of operation. The resilience block can be located inside boot device 156, or can be located in another device.

In one example, if one or more of any received data portions is found to be not authentic, the entire content of the system memory is discarded. Application controller 152 loads rescue mode code 162 from boot device 156 and runs a safety firmware with basic functionalities. In one example, these functionalities include requesting a new certified update from another source.

In another embodiment, at power on of a system, application controller 152 receives secure code stored in storage device 150 that is to be executed. The secure code is certified as being authentic prior to executing further operations by application controller 152. Boot code 164 is used to start an application of application controller 152.

In one example, a cryptographic engine executes at least a portion of boot code 164. In one example, the cryptographic measurement is a digest calculated by a MAC algorithm that is applied to received data and combined with a secret key stored in memory of boot device 156.

Various embodiments regarding a secure over-the-air (SOTA) update are now described below. In one embodiment, the update is used for updating code in boot device 156 and/or code in storage device 150. For example, the update may be a real software update. In another example, the update may be performed to repair code from a recognized attack determined by a cryptographic measurement.

In one embodiment, application controller 152 receives an update from a remote location. This update can be, for example, a storage device content update. A system provider can, for example, use this approach to update an application, such as improving functionalities and/or security. In one embodiment, application controller 152 stores the received update inside system memory 154 and/or stores the signature of the update inside system memory 154.

In one embodiment, if the received data is authenticated, the update is accepted. For example, the update is copied inside the storage device 150 for a system firmware update, or inside boot device 156 for a boot firmware update. A signature of the software update can be, for example, stored inside boot device 156 for certifying subsequent operations (e.g., operations during boot and/or run-time). If the received data fails authentication, then the system can enter or remain in a rescue mode.

In one embodiment, when an update is downloaded by application controller 152, an image is stored first in system memory (e.g., DRAM), and/or from time-to-time stored in storage device 150. The update is signed (by calculating its MAC) and the signature is the mechanism to ensure that the downloaded content inside the memory is authentic. To perform a check of the signature, all of the data is downloaded, the data is measured against the internal application secret key, and then the final signature is compared with the received signature.

In one embodiment, as mentioned above, the cryptographic measurement is a digest determined using a MAC algorithm. The measure of the OTA update implements the MAC, for example, based on a secret key (e.g., HMAC-SHA256), which is known between the system (e.g., boot device) and the authority (e.g., server or other computing device or source) sending the update. For example, the MAC is calculated as follows: Measure=MAC (Secret_Key, pages_content). In one embodiment, the exchange of system messages can be protected against anti-replay attacks, in that case: Measure=MAC (Secret_Key, pages_content | freshness).

Merely as a specific, non-limiting example, consider a Message and its MAC (signature) calculated by using an algorithm based on a secret KEY (e.g., HMAC-SHA256). In this case, the MAC algorithm is based on a secret key. The sender sends the pair of a Message and signature=MAC (KEY, Message). The receiver receives the Message and signature and recalculates locally the signature of Message with the same formula and secret KEY used by the sender. If the local calculated signature is coincident with the received one, the receiver can be sure that the message comes from the authorized sender because the sender the only one that knows the secret key and is able to generate the proper signature.

A hacker might intercept the communication and re-send later the pair (Message, Signature) in order to emulate an authentic transition. But if the information sent contains a freshness, the hacker is not able to perform this attack (replay attack). "Freshness" is, for example, a piece of information that is different at each transition of a system (e.g., a monotonic counter, a time stamp, or a NONCE). The receiver, to avoid a replay attack, checks that the freshness is good (e.g., the value of monotonic counter, time stamp, etc.) and then proceeds with the calculation of the local signature. The freshness is included in the calculation: Measure=MAC (Secret_Key, pages_content freshness).

Figure 3:
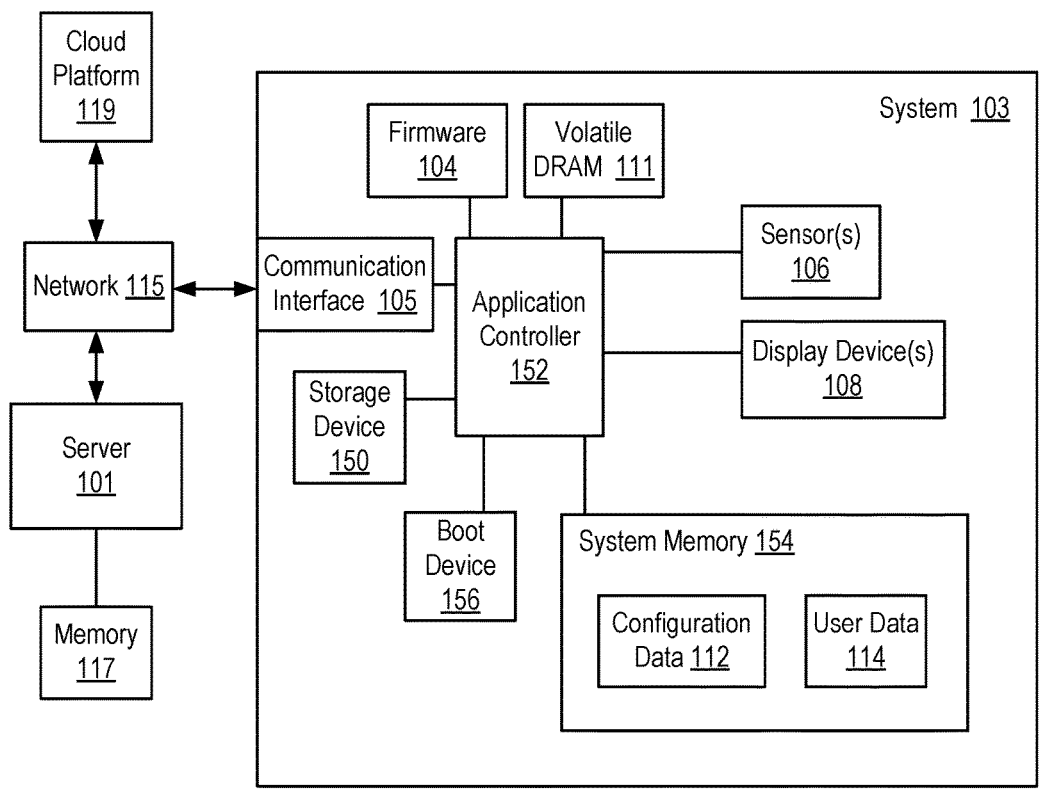
FIG. 3 shows a system for a vehicle that uses a communication interface to receive an OTA update for a storage device, a boot device, and/or other component of the vehicle (e.g., the OTA update can be for firmware in memory of the storage device), according to one embodiment.

FIG. 3 shows a system 103 for a vehicle that uses a communication interface 105 to receive an OTA update for storage device 150, boot device 156, and/or other component of the vehicle (e.g., the OTA update can be for firmware in memory of the storage device), according to one embodiment. Communication amongst two or more of the system 103, a server 101, and a cloud platform 119 can be performed over a network 115 (e.g., a wireless mobile phone or other radio network). This communication is performed using communication interface 105.

For example, in some cases system 103 may be a system application board (SAB). In this example, the application controller itself can be a system-on-chip (SOC). In other cases, for example, system 103 itself may be a system-on-chip (SOC). In these other cases, system 103 may be, for example, a monolithic package containing application controller 152.

In one embodiment, the server 101 sends a communication requesting a function or action to be performed by the system 103. The system memory 154 of the system 103 may also store user data 114 for a user of the system 103 or an application or device controlled by the system 103.

In one embodiment, the server 101 controls the loading of user data of a user into the system memory 154 of the system 103. In one embodiment, prior to generating the authorization for usage of the system 103, user data of the new user has been stored on memory 117 at the server 101 (e.g., this user data is associated with prior usage history of a user). After generating the authorization for usage of the system 103, the server 101 sends this stored new user data to the system 103 for loading into memory of the system 103.

In one embodiment, data associated with usage of system 103 is stored in a memory of cloud platform 119. For example, this data may provide authorization credentials or other data that permit a user of cloud platform 119 to access the system 103, such as by opening a door and/or starting the engine of a vehicle.

In one example, the application controller 152 controls one or more operations of a vehicle. For example, the application controller 152 controls the addition or deletion of data from the system memory 154 or other memory. The application controller 152 also controls loading of new data into the system memory 154 and/or other memory of the system 103. The application controller 152 also controls display of information on display device(s) 108. Sensor(s) 106 provide data regarding operation of the system 103. At least a portion of this operational data can be communicated to the server 101 and/or the cloud platform 119.

System memory 154 can further include, for example, configuration data 112. Configuration data 112 can be, for example, data associated with operation of the system 103 as provided by the server 101. The configuration data 112 can be, for example, data that configures operation of the system 103, for example, based on conditions associated with the vehicle.

In one embodiment, a notification of authorization for usage of system 103 is sent to or received from cloud platform 119. Server 101 also may send a communication to system 103 that includes an authorization.

In one embodiment, the server 101 checks an identity of a user associated with the system 103, and may update user data 114 and/or configuration data 112.

In one embodiment, secure over-the-air updates are provided to system 103 by cloud platform 119 using a wireless communication network 115 (e.g., in response to application controller 152 entering a rescue mode). In this embodiment, communication interface 105 is a wireless interface.

As illustrated in FIG. 3, application controller 152 also may control the display of images on one or more display devices 108. Display device 108 can be a liquid crystal display. The controller 152 may receive data collected by one or more sensors 106. The sensors 106 may be, for example, integrated into the system 103. In another example, the sensors 106 may include, for example, a camera, a microphone, a motion detector, and/or a camera that provides data to the system 103. The sensors 106 also may include, for example, sensors incorporated in wearable devices worn by, or a client device of, the driver and/or passengers in a vehicle that includes the system 103.

In one embodiment, application controller 152 analyzes the collected data from the sensors 106. The analysis of the collected data includes providing some or all of the collected data to server 101 and/or cloud platform 119.

In one embodiment, memory stores data collected by sensors 106 and/or data received by communication interface 105 from a computing device, such as, for example, server 101. For example, this communication may be used to wirelessly transmit collected data from the sensors 106 to the server 101. The data received by the system 103 may include configuration or other data used to configure control of the display devices 108 by application controller 152.

In FIG. 3, firmware 104 controls, for example, the operations of the application controller 152 in determining whether to accept or reject data based on a cryptographic measurement of data, as described herein. The application controller 152 also can, for example, run the firmware 104 to perform operations responsive to communications from the server 101 and/or cloud platform 119. Firmware in general is a type of computer program that provides control, monitoring, and data manipulation of engineered computing devices.

The system 103 includes volatile Dynamic Random-Access Memory (DRAM) 111 for the storage of run-time data and instructions used by the application controller 152 to improve the computation performance of the controller 152 and/or provide buffers for data transferred between the server 101 and memory 109. DRAM 111 is volatile in that it requires power to maintain the data/information stored therein, which data/information is lost immediately or rapidly when the power is interrupted.

Volatile DRAM 111 typically has less latency than non-volatile storage media, but loses its data quickly when power is removed. Thus, it is advantageous to use the volatile DRAM 111 to temporarily store instructions and data used for the controller 152 in its current computing task to improve performance. In some instances, the volatile DRAM 111 is replaced with volatile Static Random-Access Memory (SRAM) that uses less power than DRAM in some applications. When the system memory 154 has data access performance (e.g., in latency, read/write speed) comparable to volatile DRAM 111, the volatile DRAM 111 can be eliminated; and the application controller 152 can perform computing by operating on the system memory 154 for instructions and data instead of operating on the volatile DRAM 111.

In one embodiment, the system memory 154 includes the volatile DRAM 111, and the firmware 104 is loaded into and stored in the volatile DRAM 111. In one embodiment, system memory 154 includes a non-volatile storage media, such as magnetic material coated on rigid disks, and/or memory cells in an integrated circuit. The storage media is non-volatile in that no power is required to maintain the data/information stored in the non-volatile storage media, which data/information can be retrieved after the non-volatile storage media is powered off and then powered on again. In some embodiments, the system memory 154 includes both volatile and non-volatile memory.

In one embodiment, system memory 154 is implemented using various memory/storage technologies, such as NAND gate based flash memory, phase-change memory (PCM), magnetic memory (MRAM), resistive random-access memory, and 3D XPoint, such that the system memory 154 is non-volatile and can retain data stored therein without power for days, months, and/or years.

In one embodiment server 101 communicates with the communication interface 105 via a communication channel having a predetermined protocol.

In one embodiment, the server 101 can be a computer having one or more Central Processing Units (CPUs) to which systems, such as the system 103, may be connected using a computer network. For example, in some implementations, the communication channel between the server 101 and the communication interface 105 includes a computer network, such as a local area network, a wireless local area network, a cellular communications network, or a broadband high-speed always-connected wireless communication connection (e.g., a current or future generation of mobile network link).

In some instances, the application controller 152 has in-processor cache memory with data access performance that is better than the volatile DRAM 111 and/or the system memory 154. In some instances, the application controller 152 has multiple processors, each having its own in-processor cache memory.

In one embodiment, the application controller 152 performs data intensive, in-memory processing using data and/or instructions organized in system memory or otherwise organized in the system 103. For example, the application controller 152 can perform a real-time analysis of a set of data collected and/or stored in the system 103. For example, in some applications, the system 103 is connected to real-time sensors 106 to store sensor inputs; and the processors of the controller 152 are configured to perform machine learning and/or pattern recognition based on the sensor inputs to support an artificial intelligence (AI) system that is implemented at least in part via the system 103, cloud platform 119, and/or the server 101. This analysis of data can be, for example, associated with operation of a vehicle. This analysis can include, for example, analysis of user data 114.

The system 103 can interact with various computing systems, such as a cloud computing system (e.g., cloud platform 119), an edge computing system, a fog computing system, and/or a standalone computer. In a cloud computing system, remote computer servers are connected in a network to store, manage, and process data. An edge computing system optimizes cloud computing by performing data processing at the edge of the computer network that is close to the data source and thus reduces data communications with a centralized server and/or data storage. A fog computing system uses one or more end-user devices or near-user edge devices to store data and thus reduces or eliminates the need to store the data in a centralized data warehouse.

At least some embodiments of the systems and methods disclosed herein can be implemented using computer instructions executed by the application controller 152 (and/or other controllers or devices), such as the firmware 104. In some instances, hardware circuits can be used to implement at least some of the functions of the firmware 104. The firmware 104 can be initially stored in non-volatile storage media, such as by using system memory 154, or another non-volatile device (e.g., a storage device 150 and/or boot device 156), and loaded into the volatile DRAM 111 and/or the in-processor cache memory for execution by the controller 152.

For example, the firmware 104 can be configured to use the techniques discussed herein for obtaining an OTA update, or checking authenticity of data. However, the techniques discussed herein are not limited to being used in the system 103 of FIG. 3 and/or the examples discussed herein.

Figure 4:
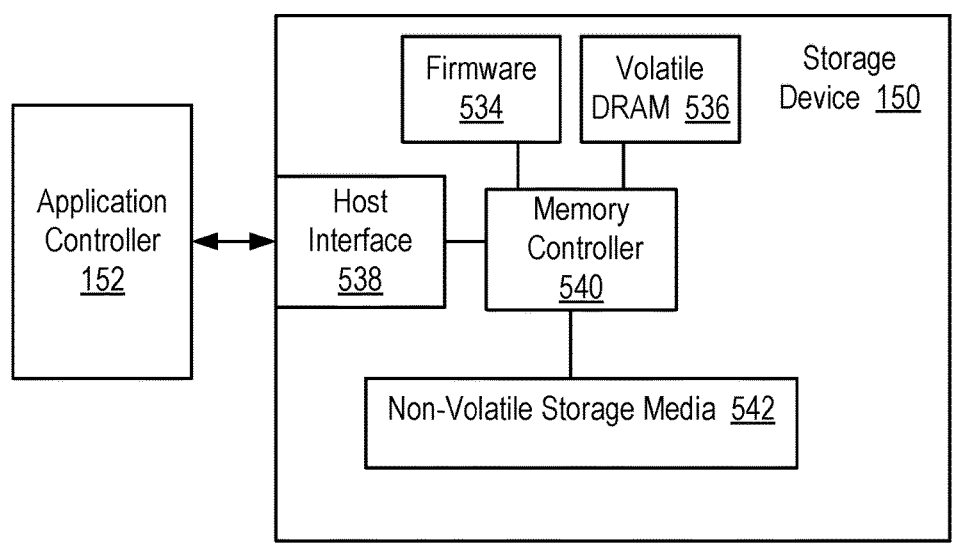
FIG. 4 shows an application controller of a vehicle that receives an OTA update, wherein the OTA update is use to update firmware stored in a storage device, according to one embodiment.

FIG. 4 shows application controller 152 of a vehicle and that receives an OTA update, wherein the OTA update is use to update firmware stored in storage device 150, according to one embodiment.

The storage device 150 in FIG. 4 includes non-volatile storage media 542, for example having memory of different types. The data stored in storage device 150 can be loaded into, for example, local buffer 158 of boot device 156.

In FIG. 4, the application controller 152 communicates with the storage device 150 via a communication channel regarding read/write operations using logical addresses. The storage device 150 can be used to store data for the application controller 152 in the non-volatile storage media 542. Examples of computer storage devices in general include hard disk drives (HDDs), solid state drives (SSDs), flash memory, dynamic random-access memory, magnetic tapes, network attached storage device, etc.

The storage device 150 has a host interface 538 that implements communications with the application controller 152 using the communication channel. For example, the communication channel between the application controller 152 and the storage device 150 is a Peripheral Component Interconnect Express (PCI Express or PCIe) bus in one embodiment; and the application controller 152 and the storage device 150 communicate with each other using NVMe protocol (Non-Volatile Memory Host Controller Interface Specification (NVMHCI), also known as NVM Express (NVMe)).

In some implementations, the communication channel between the application controller 152 and the storage device 150 includes a computer network, such as a local area network, a wireless local area network, a wireless personal area network, a cellular communications network, a broadband high-speed always-connected wireless communication connection (e.g., a current or future generation of mobile network link); and the application controller 152 and the storage device 150 can be configured to communicate with each other using data storage management and usage commands similar to those in NVMe protocol.

The storage device 150 has a memory controller 540 that runs firmware 534 to perform operations responsive to the communications from the application controller 152. In various embodiments, firmware is a type of computer program that provides control, monitoring and data manipulation of computing devices. In FIG. 4, the firmware 534 controls the operations of the memory controller 540 in operating the storage device 150.

The storage device 150 has non-volatile storage media 542, such as magnetic material coated on rigid disks, and/or memory cells in an integrated circuit. The storage media 540 is non-volatile in that no power is required to maintain the data/information stored in the non-volatile storage media 540, which data/information can be retrieved after the non-volatile storage media 540 is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media 540 is non-volatile and can retain data stored therein without power for days, months, and/or years.

The storage device 150 includes volatile Dynamic Random-Access Memory (DRAM) 546 for the storage of run-time data and instructions used by the memory controller 540 to improve the computation performance of the memory controller 540 and/or provide buffers for data transferred between the application controller 152 and the non-volatile storage media 542. DRAM 536 is volatile in that it requires power to maintain the data/information stored therein, which data/information is lost immediately or rapidly when the power is interrupted.

Figure 5:
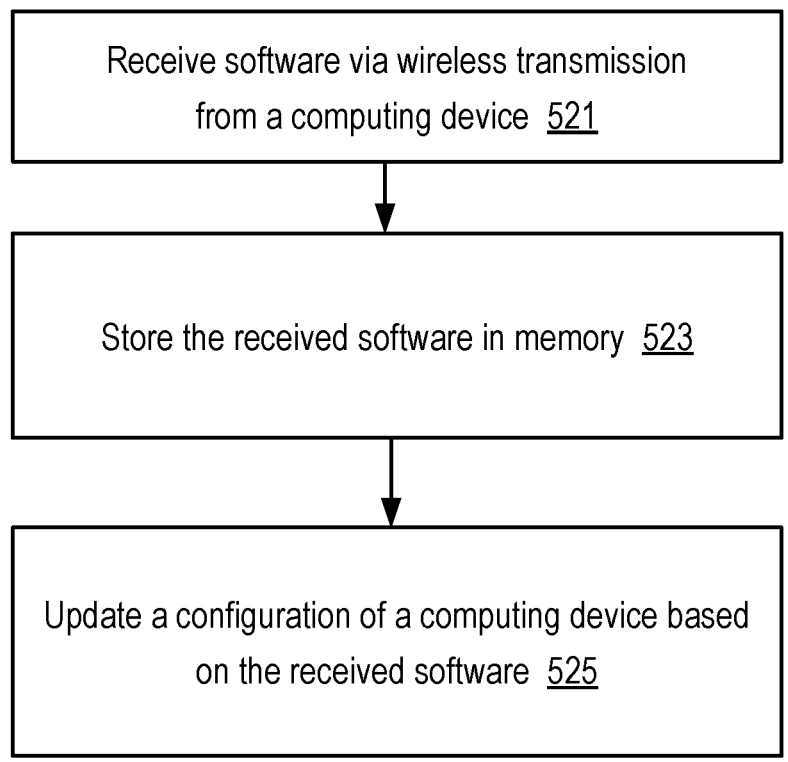
FIG. 5 shows a method for updating a configuration of a computing device based on software received via wireless transmission (e.g., a secure OTA update), according to one embodiment.

FIG. 5 shows a method for updating a configuration of a computing device based on software received via wireless transmission (e.g., a secure OTA update), according to one embodiment.

At block 521, software is received via a wireless transmission from a computing device (e.g., from server 101 or cloud platform 119). In one example, the software is an SOTA update of firmware for application controller 152, storage device 150, or boot device 156.

At block 523, the received software is stored in memory. In one example, the received software is stored in memory 206 or system memory 154.

At block 525, a configuration of a computing device is updated based on the received software. For example, the computing device can be a hardware component of an autonomous vehicle. The received software can update firmware of the hardware component so that a functional configuration of operation of the component is updated or changed. For example, control signal timing and/or protocols can be changed. In another example, the operation of a display device, navigation system, and/or driving system of the vehicle can be changed.

Various additional embodiments are now described below. In one embodiment, a method includes: receiving, by a first computing device (e.g., application controller 152, system 103, vehicle 703, or autonomous vehicle 803) via wireless transmission, software from a second computing device (e.g., server 101, server 701, or server 801); storing the received software in memory of the first computing device; and updating, based on the received software, a configuration of the first computing device.

In one embodiment, the first computing device is an application controller of a vehicle, and receiving the software comprises receiving an over-the-air update of the software.

In one embodiment, the method further comprises detecting a malfunction for an application executed by the application controller, wherein the update is requested by the application controller in response to detecting the malfunction, and wherein the update reconfigures at least one function of the application.

In one embodiment, the method further comprises updating firmware using the received software, wherein updating the firmware modifies at least one action performed during execution of the firmware.

In one embodiment, the updated firmware is stored on a boot device or a storage device.

In one embodiment, the method further comprises: determining, by the first computing device, to accept the software; and in response to determining to accept the software, storing the software in system memory (e.g., system memory 154) of the first computing device.

In one embodiment, the method further comprises determining authenticity of the software by calculating a digest using a message authentication code, wherein the software and a secret key are inputs to the message authentication code, and wherein the secret key is stored in memory of the first computing device.

In one embodiment, the first computing device controls at least one function of a vehicle, and the method further comprises: prior to receiving the software, authenticating a user of the vehicle; and in response to authenticating the user, requesting the software from the second computing device.

In one embodiment, the first computing device comprises an application controller, and the method further comprises, prior to receiving the software from the second computing device, loading boot code to the application controller for starting an application of the first computing device.

Figure 6:
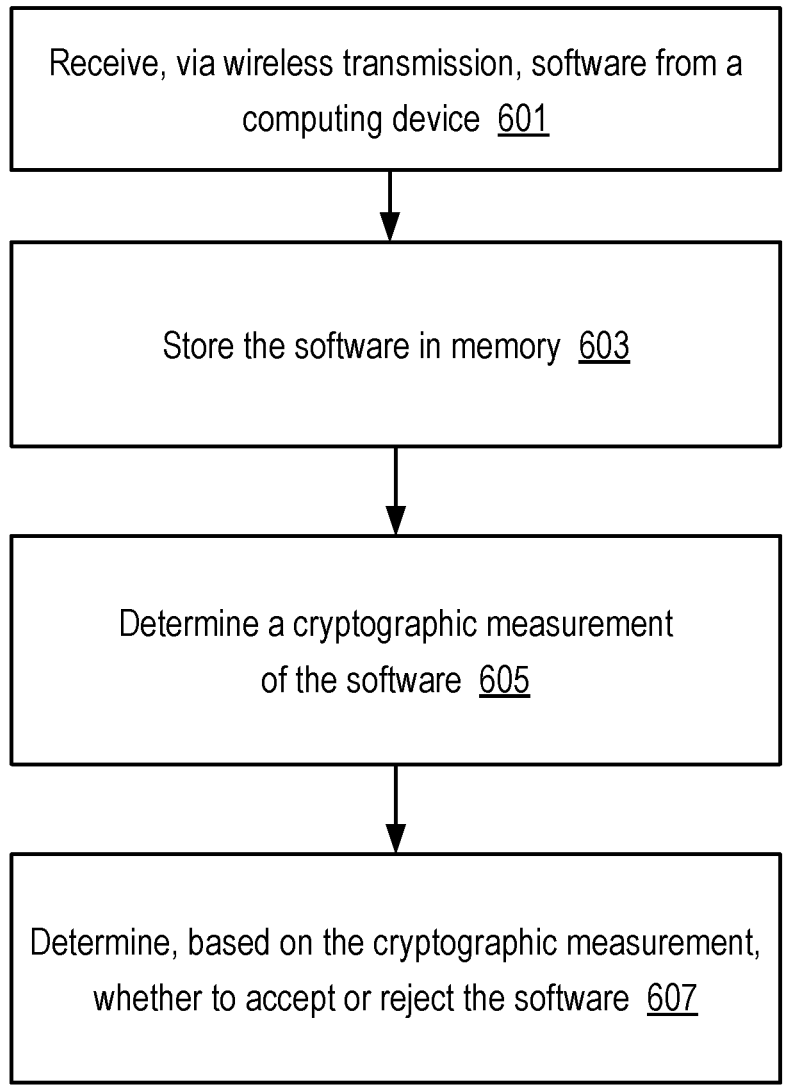
FIG. 6 shows a method for determining whether to accept or reject software received via wireless transmission from a computing device, according to one embodiment.

FIG. 6 shows a method for determining whether to accept or reject software received via wireless transmission from a computing device, according to one embodiment. In one example, the software is an SOTA update received from server 101.

At block 601, software is received from a computing device via wireless transmission (e.g., cellular radio communication, Wi-Fi, near-field communication, etc.).

At block 603, the received software stored in memory. At block 605, a cryptographic measurement is determined for the software.

At block 607, a determination is made whether to accept or reject the received software based on the cryptographic measurement. For example, the cryptographic measurement may be used by application controller 152, controller 707, or controller 807 to determine that the source of the software is not authentic. In such case, the software is rejected.

Various additional embodiments are now described below. In one embodiment, a method includes: receiving, by at least one processor via wireless transmission, software from a computing device; storing the software in memory; determining, by the at least one processor, a cryptographic measurement of the software; and determining, by the at least one processor, based on the cryptographic measurement, whether to accept or reject the software.

In one embodiment, the computing device is at least one server, and storing the software in memory comprises storing the software in memory of a boot device.

In one embodiment, the method further comprises, in response to authenticating the software, copying the software to system memory.

In one embodiment, the method further comprises, in response to determining to reject the software, causing an application controller to enter a rescue mode.

In one embodiment, receiving the software from the computing device comprises receiving a first software update; and the rescue mode comprises causing the application controller to load rescue mode code from a boot device, and to execute the rescue mode code to obtain a second software update from the computing device.

In one embodiment, the computing device is a cloud platform, and the cryptographic measurement is determined by a cryptographic engine of an application controller, and the method further comprises: prior to determining the cryptographic measurement, causing the application controller to receive a data value from a boot device, and to store the data value in memory of the application controller.

In one embodiment, the method further comprises, in response to determining to reject the software, causing the application controller to discard software previously-stored in system memory of the application controller.

In one embodiment, the at least one processor controls at least one function of a vehicle, and the method further comprises: prior to receiving the software from the computing device, collecting data from at least one sensor of the vehicle; analyzing the collected data, the analyzing comprising providing the collected data as an input to a computer model; determining an output from the computer model; determining, based on the output from the computer model, at least one desired characteristic; and sending at least one communication to the computing device, wherein the at least one communication identifies the at least one desired characteristic, and wherein the computing device is configured to, in response to receiving the at least one communication, select the software based on the at least one desired characteristic. In one example, the selected software is a firmware update that changes an operational configuration of a hardware component of a vehicle.

In one embodiment, a system comprises: at least one processor; and memory containing instructions configured to instruct the at least one processor to: receive, via wireless transmission, a software update; store the software update in a first memory; determine a cryptographic measurement of the software update; and determine, based on the cryptographic measurement, whether to accept or reject the software update.

In one embodiment, the instructions are further configured to instruct the at least one processor to, in response to determining to reject the software update, update at least a portion of software stored in system memory.

In one embodiment, a computer program corresponding to the software update is stored in system memory, and the instructions are further configured to instruct the at least one processor to, in response to determining to accept the software update, execute the computer program.

In various embodiments, a non-transitory computer storage medium is used to store instructions of the firmware 104 of system 103, and/or firmware of other components (e.g., application controller 152, storage device 150, boot device 156, vehicle 703, or vehicle 803). When the instructions are executed by a controller (e.g., an application controller, or a controller of a boot or storage device), the instructions cause the controller to perform any of the methods discussed herein.

Figure 7:
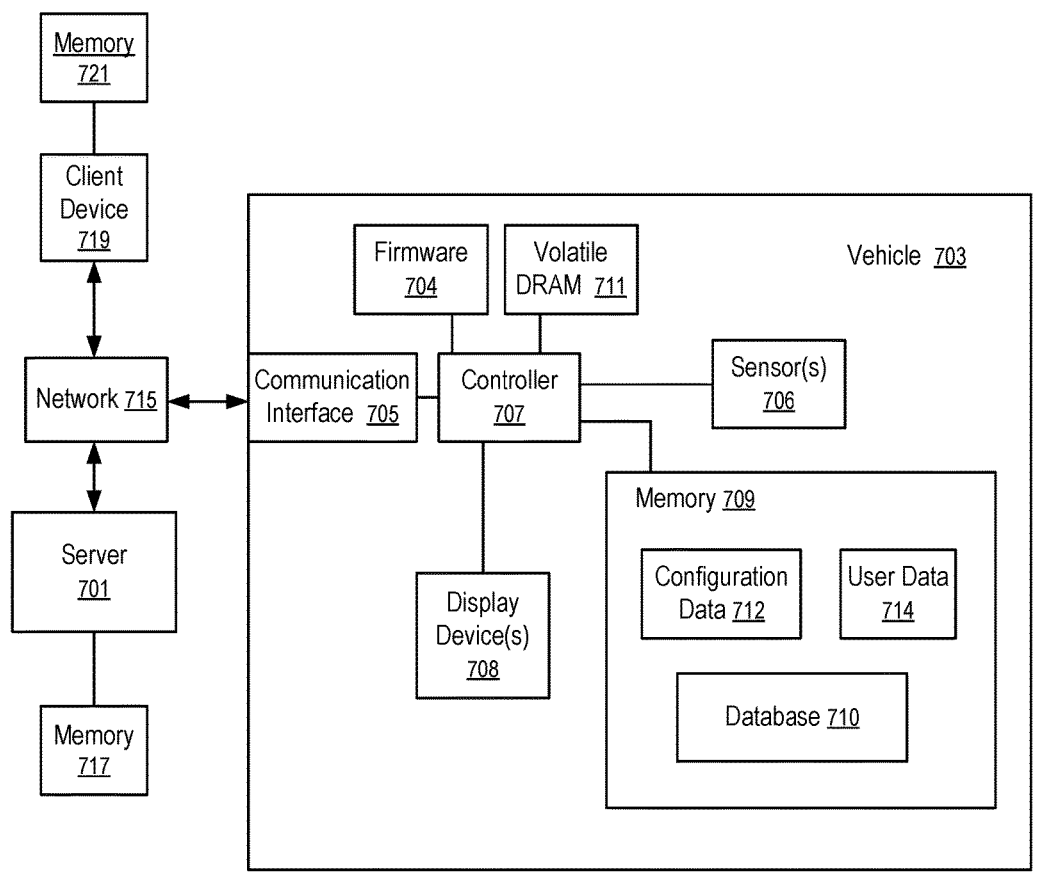
FIG. 7 shows a vehicle including a communication interface used to receive an OTA update for firmware, according to one embodiment.

FIG. 7 shows a vehicle 703 including a communication interface 705 used to receive an OTA update for firmware, according to one embodiment. Communication amongst two or more of the vehicle 703, a server 701, and a client device 719 can be performed over a network 715 (e.g., a wireless network). This communication is performed using communication interface 705.

In one embodiment, the server 701 generates an authorization for usage of the vehicle 703 by a new user. The memory 709 of the vehicle 703 stores prior user data 714 for a prior user of the vehicle. In one embodiment, the server 701 controls the loading of user data of the new user into the memory 709 of the vehicle.

In one embodiment, data associated with usage of vehicle 703 is stored in a memory 721 of client device 719. For example, this data may provide authorization credentials or other data that permit a user of client device 719 to access the vehicle 703, such as by opening a door and/or starting the engine of vehicle.

A controller 707 controls one or more operations of the vehicle 703. For example, controller 707 controls user data 714 stored in memory 709. Controller 707 also controls loading of user data into memory 709 and/or other memory of the vehicle 703. Controller 707 also controls display of information on display device(s) 708. Sensor(s) 706 provide data regarding operation of the vehicle 703. At least a portion of this operational data can be communicated to the server 701 and/or the client device 719.

Memory 709 can further include, for example, configuration data 712 and/or database 710. Configuration data 712 can be, for example, data associated with operation of the vehicle 703 as provided by the server 701. The configuration data 712 can be, for example, data that constrains operation of the vehicle 703, for example based on conditions associated with a vehicle.

Database 710 can store, for example, data collected by sensors 706. Database 710 also can store, for example, navigational maps and/or other data provided by the server 701 in response to opening of a record for usage of the vehicle 703 by a new user.

In one embodiment, a notification of authorization for usage of vehicle 703 is sent to the client device 719. Server 701 also may send a communication to vehicle 703 that includes an indication of this authorization.

In one embodiment, when a vehicle is being operated, data regarding activity of vehicle 703 can be communicated to server 701. This activity may include navigational and/or other operational aspects of the vehicle 703.

In one embodiment, the server 701 authorizes usage of the vehicle by sending (e.g., to client device 719) data such as, for example, a PIN, NFC ID coordinates of a user, and/or providing data regarding usage by the user of a fingerprint and/or other biometric characteristics of a user. The user can, for example, use some or all of this data to access the vehicle 703. The user also can receive, for example, an approval from server 701 with and/or indicating an authorization for usage of vehicle 703 on client device 719.

In one embodiment, the server 701 sends a request to the vehicle 703 for a status report and/or other data regarding the vehicle 703. In response to the request, the server 701 receives the status report, and then the server 701 causes (e.g., by sending a communication to the vehicle 703 based on data in the status report) the vehicle 703 to configure user data 714 of the user in memory 709.

As illustrated in FIG. 7, controller 707 also may control the display of images on one or more display devices 708. Display device 708 can be a liquid crystal display. The controller 707 may receive data collected by one or more sensors 706. The sensors 706 may be, for example, mounted in the vehicle 703. The sensors 706 may include, for example, a camera, a microphone, a motion detector, and/or a camera. The sensors 706 also may include, for example, sensors incorporated in wearable devices worn by, or a client device of, the driver and/or passengers in the vehicle 703.

The sensors 706 may provide various types of data for collection by the controller 707. For example, the collected data may include image data from the camera and/or audio data from the microphone.

In one embodiment, the image data includes images of one or more faces of the driver and/or passengers. In another embodiment, the collected data includes biometric data for one or more persons in the vehicle 103. The biometric data may be provided, for example, by a wearable device.

In one embodiment, the controller 707 analyzes the collected data from the sensors 706. The analysis of the collected data includes providing some or all of the collected data to server 701.

In one embodiment, memory 709 stores database 710, which may include data collected by sensors 706 and/or data received by communication interface 705 from a computing device, such as, for example, server 701. For example, this communication may be used to wirelessly transmit collected data from the sensors 706 to the server 701. The data received by the vehicle may include configuration or other data used to configure control of the display devices 708 by controller 707.

In FIG. 7, firmware 704 controls, for example, the operations of the controller 707. The controller 707 also can, for example, run the firmware 704 to perform operations responsive to communications from the server 701.

The vehicle 703 includes volatile Dynamic Random-Access Memory (DRAM) 711 for the storage of run-time data and instructions used by the controller 707 to improve the computation performance of the controller 707 and/or provide buffers for data transferred between the server 701 and memory 709. DRAM 711 is volatile.

Figure 8:
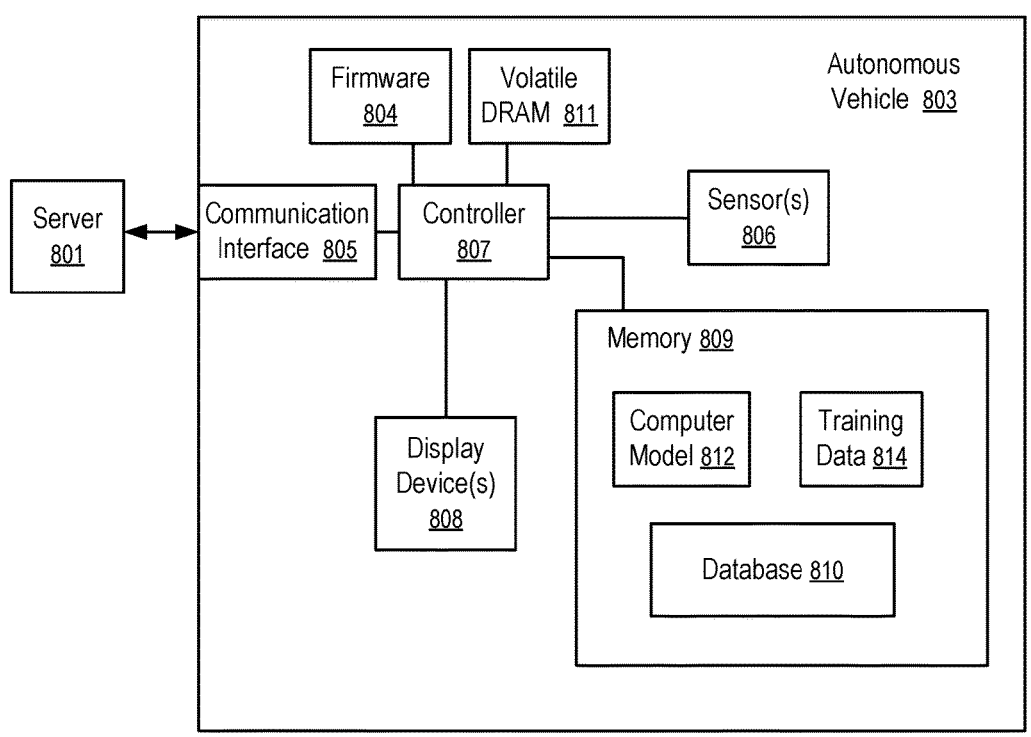
FIG. 8 shows an autonomous vehicle including a communication interface used to receive an OTA update, according to one embodiment.

FIG. 8 shows an autonomous vehicle 803 including a communication interface 805 used to receive an OTA update, according to one embodiment. As illustrated in FIG. 8, a controller 807 controls the display of images on one or more display devices 808. In one example, display device 808 can be a liquid crystal display.

The controller 807 may receive data collected by one or more sensors 806. The sensors 806 may be, for example, mounted in the autonomous vehicle 803. The sensors 806 may provide various types of data for collection by the controller 807. For example, the collected data may include image data from the camera and/or audio data from the microphone.

In one embodiment, the controller 807 analyzes the collected data from the sensors 806. The analysis of the collected data includes providing some or all of the collected data as one or more inputs to a computer model 812. The computer model 812 can be, for example, an artificial neural network trained by deep learning. In another example, the computer model is a machine learning model that is trained using training data 814. The computer model 812 and/or the training data 814 can be stored, for example, in memory 809.

In one embodiment, memory 809 stores a database 810, which may include data collected by sensors 806 and/or data received by a communication interface 805 from computing device, such as, for example, a server 801. For example, this communication may be used to wirelessly transmit collected data from the sensors 806 to the server 801.

The received data may include configuration, training, and other data used to configure control of the display devices 808 (and/or other components of the vehicle) by controller 807. In one embodiment, the received data is an over-the-air update received via wireless transmission over communication interface 805.

For example, the received data may include data collected from sensors of autonomous vehicles other than autonomous vehicle 803. This data may be included, for example, in training data 814 for training of the computer model 812. The received data may also be used to update a configuration of a machine learning model stored in memory 809 as computer model 812.

In FIG. 8, firmware 804 controls, for example, the operations of the controller 807 in controlling the display devices 808 as described herein. The controller 807 also can, for example, run the firmware 804 to perform operations responsive to communications from the server 801.

The autonomous vehicle 803 includes volatile Dynamic Random-Access Memory (DRAM) 811 for the storage of run-time data and instructions used by the controller 807 to improve the computation performance of the controller 807 and/or provide buffers for data transferred between the server 801 and memory 809.

In one embodiment, the controller 807 performs real-time analysis of a set of data collected and/or stored in the autonomous vehicle 803. For example, in some applications, the autonomous vehicle 803 is connected to real-time sensors 806 to store sensor inputs; and the processors of the controller 807 are configured to perform machine learning and/or pattern recognition based on the sensor inputs to support an artificial intelligence (AI) system that is implemented at least in part via the autonomous vehicle 803 and/or the server 801.

At least some embodiments of the systems and methods disclosed herein can be implemented using computer instructions executed by the controller 807, such as the firmware 804. For example, the firmware 804 can be configured to use the techniques discussed herein for over-the-air software updates.

Figure 9:
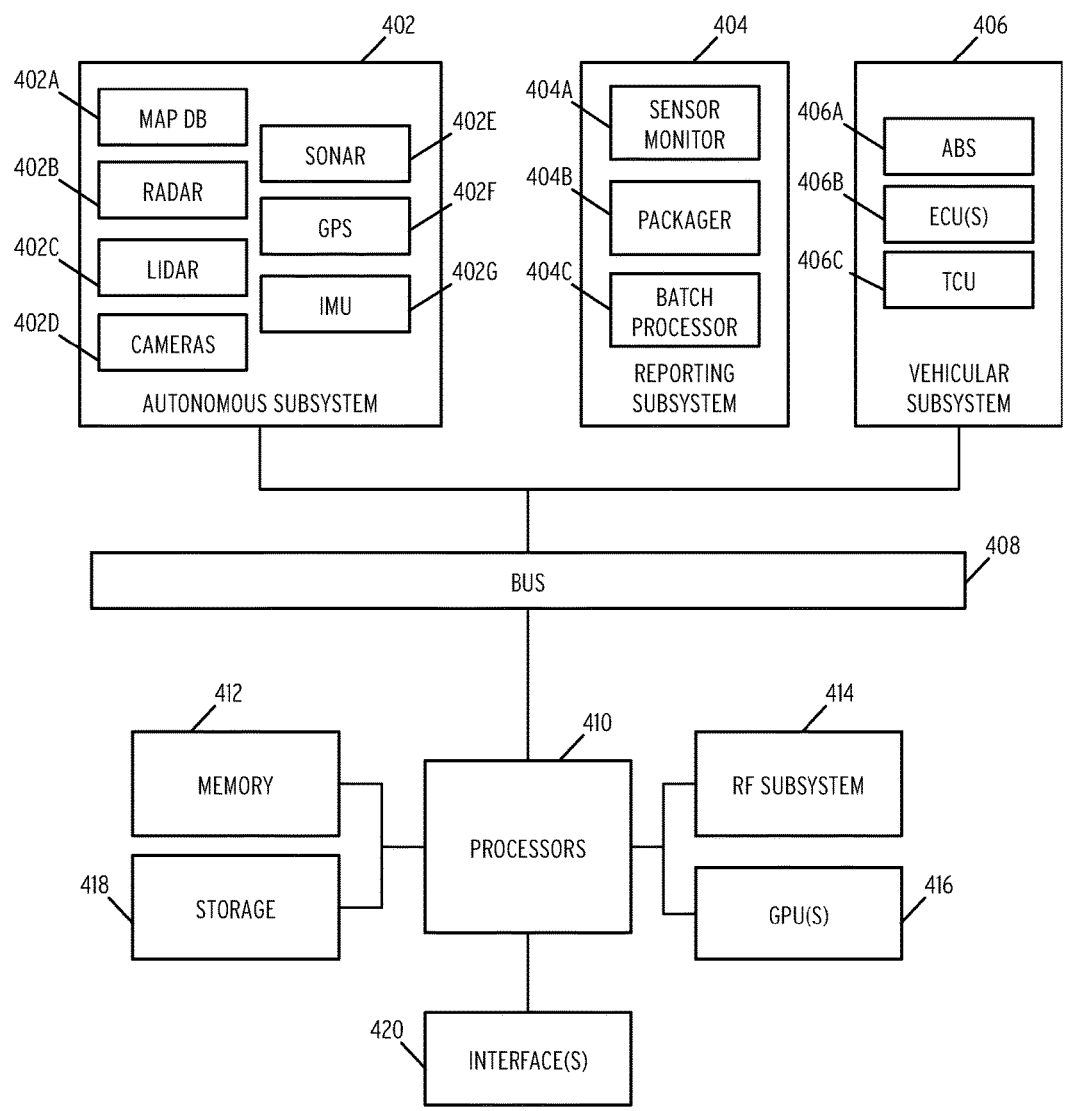
FIG. 9 is a block diagram of an autonomous vehicle including various components that can be updated using an OTA update of firmware, according to various embodiments.

FIG. 9 is a block diagram of an autonomous vehicle including one or more various components and/or subsystems, each of which can be updated in various embodiments using an OTA update of firmware as was described above. The system illustrated in FIG. 9 may be installed entirely within a vehicle.

The system includes an autonomous vehicle subsystem 402. In the illustrated embodiment, autonomous vehicle subsystem 402 includes map database 402A, radar devices 402B, Lidar devices 402C, digital cameras 402D, sonar devices 402E, GPS receivers 402F, and inertial measurement units 402G. Each of the components of autonomous vehicle subsystem 402 comprise standard components provided in most current autonomous vehicles. In one embodiment, map database 402A stores a plurality of high-definition three-dimensional maps used for routing and navigation. Radar devices 402B, Lidar devices 402C, digital cameras 402D, sonar devices 402E, GPS receivers 402F, and inertial measurement units 402G may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem 406 is additionally included within the system. Vehicular subsystem 406 includes various anti-lock braking systems 406A, engine control units 402B, and transmission control units 402C. These components may be utilized to control the operation of the autonomous vehicle in response to the streaming data generated by autonomous vehicle subsystem 402A. The standard autonomous vehicle interactions between autonomous vehicle subsystem 402 and vehicular subsystem 406 are generally known in the art and are not described in detail herein.

The processing side of the system includes one or more processors 410, short-term memory 412, an RF system 414, graphics processing units (GPUs) 416, long-term storage 418 and one or more interfaces 420.

The one or more processors 410 may comprise central processing units, FPGAs, or any range of processing devices needed to support the operations of the autonomous vehicle. Memory 412 comprises DRAM or other suitable volatile RAM for temporary storage of data required by processors 410. RF system 414 may comprise a cellular transceiver and/or satellite transceiver. Long-term storage 418 may comprise one or more high-capacity solid-state drives (SSDs). In general, long-term storage 418 may be utilized to store, for example, high-definition maps, routing data, and any other data requiring permanent or semi-permanent storage. GPUs 416 may comprise one more high throughput GPU devices for processing data received from autonomous vehicle subsystem 402A. Finally, interfaces 420 may comprise various display units positioned within the autonomous vehicle (e.g., an in-dash screen).

The system additionally includes a reporting subsystem 404 which performs data collection (e.g., collection of data obtained from sensors of the vehicle that is used to drive the vehicle). The reporting subsystem 404 includes a sensor monitor 404A which is connected to bus 408 and records sensor data transmitted on the bus 408 as well as any log data transmitted on the bus. The reporting subsystem 404 may additionally include one or more endpoints to allow for system components to transmit log data directly to the reporting subsystem 404.

The reporting subsystem 404 additionally includes a packager 404B. In one embodiment, packager 404B retrieves the data from the sensor monitor 404A or endpoints and packages the raw data for transmission to a central system (illustrated in FIG. 10). In some embodiments, packager 404B may be configured to package data at periodic time intervals. Alternatively, or in conjunction with the foregoing, packager 404B may transmit data in real-time and may compress data to facilitate real-time communications with a central system.

The reporting subsystem 404 additionally includes a batch processor 404C. In one embodiment, the batch processor 404C is configured to perform any preprocessing on recorded data prior to transmittal. For example, batch processor 404C may perform compression operations on the data prior to packaging by packager 404B. In another embodiment, batch processor 404C may be configured to filter the recorded data to remove extraneous data prior to packaging or transmittal. In another embodiment, batch processor 404C may be configured to perform data cleaning on the recorded data to conform the raw data to a format suitable for further processing by the central system.

Each of the devices is connected via a bus 408. In one embodiment, the bus 408 may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 10:
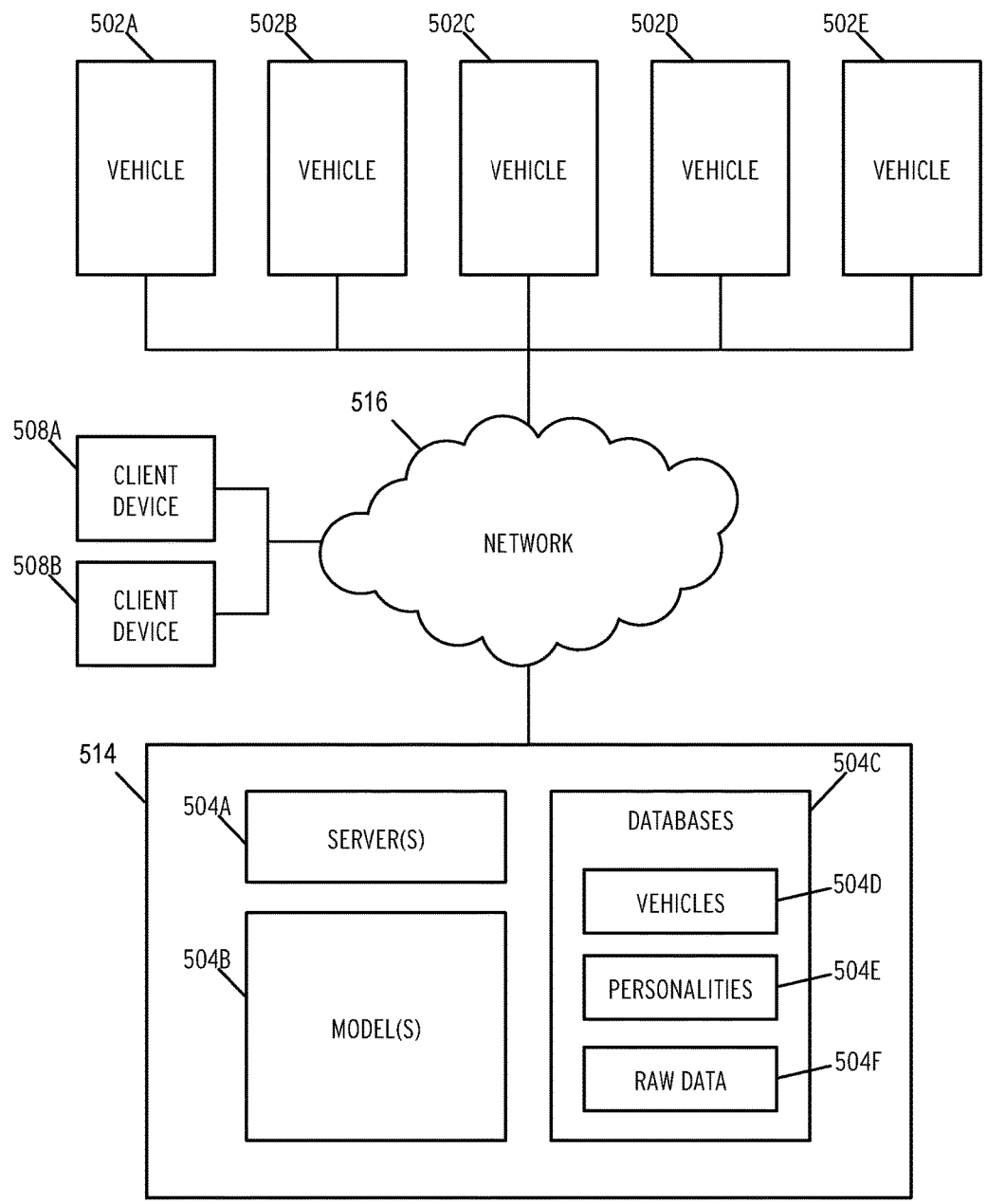
FIG. 10 is a block diagram of a centralized autonomous vehicle operations system, according to various embodiments.

FIG. 10 is a block diagram of a centralized autonomous vehicle operations system, according to various embodiments. As illustrated, the system includes a number of autonomous vehicles 502A-502E. In one embodiment, each autonomous vehicle may comprise an autonomous vehicle such as that depicted in FIG. 9. Each autonomous vehicle 502A-502E may communicate with a central system 514 via a network 516. In one embodiment, network 516 comprises a global network such as the Internet.

In one example, central system 514 is implemented using one or more of servers 101, 701, and/or 801. In one example, one or more of autonomous vehicles 502A-502E are autonomous vehicle 803.

The system additionally includes a plurality of client devices 508A, 508B. In the illustrated embodiment, client devices 508A, 508B may comprise any personal computing device (e.g., a laptop, tablet, mobile phone, etc.). Client devices 508A, 508B may issue requests for data from central system 514. In one embodiment, client devices 508A, 508B transmit requests for data to support mobile applications or web page data, as described previously.

In one embodiment, central system 514 includes a plurality of servers 504A. In one embodiment, servers 504A comprise a plurality of front end webservers configured to serve responses to client device 508A, 508B. The servers 504A may additionally include one or more application servers configured to perform various operations to support one or more vehicles.

In one embodiment, central system 514 additionally includes a plurality of models 504B. In one embodiment, models 504B may store one or more neural networks for classifying autonomous vehicle objects. The models 504B may additionally include models for predicting future events. In some embodiments the models 504B may store a combination of neural networks and other machine learning models.

Central system 514 additionally includes one or more databases 504C. The databases 504C may include database record for vehicles 504D, personalities 504E, and raw data 504F. Raw data 504F may comprise an unstructured database for storing raw data received from sensors and logs as discussed previously.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully-functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, nonvolatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   receiving, by a first computing device, a first software update from a second computing device;
   determining a cryptographic measurement of the first software update;
   determining, based on the cryptographic measurement, whether to accept or reject the first software update;
   in response to determining to reject the first software update, entering a rescue mode to load rescue mode code, and to execute the rescue mode code to obtain a second software update from the second computing device;
   receiving, by the first computing device via wireless transmission, the second software update from the second computing device;
   determining authenticity of the second software update by calculating a digest using a message authentication code, wherein the second software update and a secret key are inputs to the message authentication code, and wherein the secret key is stored in memory of the first computing device;
   storing the received second software update in memory of the first computing device; and
   updating, based on the received second software update, a configuration of the first computing device.

2. The method of claim 1, wherein the first computing device is an application controller of a vehicle, and receiving the first software update comprises receiving an over-the-air update of the first software update.

3. The method of claim 2, further comprising detecting a malfunction for an application executed by the application controller, wherein the update is requested by the application controller in response to detecting the malfunction, and wherein the update reconfigures at least one function of the application.

4. The method of claim 1, further comprising updating firmware using the received second software update, wherein updating the firmware modifies at least one action performed during execution of the firmware.

5. The method of claim 4, wherein the updated firmware is stored on a boot device or a storage device.

6. The method of claim 1, wherein the memory of the first computing device is system memory, the method further comprising:
   determining, by the first computing device, to accept the second software update;
   wherein the received second software update is stored in the system memory.

7. The method of claim 1, wherein the first computing device controls at least one function of a vehicle, the method further comprising:
   prior to receiving the first software update, authenticating a user of the vehicle; and
   in response to authenticating the user, requesting the first software update from the second computing device.

8. The method of claim 1, wherein the first computing device comprises an application controller, the method further comprising, prior to receiving the first software update from the second computing device, loading boot code to the application controller for starting an application of the first computing device.

9. A method comprising:
receiving, by at least one processor via wireless transmission, a first software update from a computing device;
storing the first software update in memory of a boot device;
determining, by the at least one processor, a cryptographic measurement of the first software update;
determining, by the at least one processor, based on the cryptographic measurement, whether to accept or reject the first software update;
in response to determining to reject the first software update, causing an application controller to enter a rescue mode, wherein the rescue mode comprises causing the application controller to load rescue mode code from the boot device, and to execute the rescue mode code to obtain a second software update from the computing device; and
determining authenticity of the second software update by calculating a digest using a message authentication code, wherein the second software update and a secret key are inputs to the message authentication code, and wherein the secret key is stored in memory.

10. The method of claim 9, wherein the computing device is at least one server.

11. The method of claim 9, further comprising, in response to determining the authenticity of the second software update, copying the second software update to system memory.

12. The method of claim 9, wherein the computing device is a cloud platform, and the cryptographic measurement is determined by a cryptographic engine of the application controller, the method further comprising:
prior to determining the cryptographic measurement, causing the application controller to receive a data value from the boot device, and to store the data value in memory of the application controller.

13. The method of claim 12, further comprising, in response to determining to reject the first software update, causing the application controller to discard software previously-stored in system memory of the application controller.

14. The method of claim 9, wherein the at least one processor controls at least one function of a vehicle, the method further comprising:
prior to receiving the first software update from the computing device, collecting data from at least one sensor of the vehicle;
analyzing the collected data, the analyzing comprising providing the collected data as an input to a computer model;
determining an output from the computer model;
determining, based on the output from the computer model, at least one desired characteristic; and
sending at least one communication to the computing device, wherein the at least one communication identifies the at least one desired characteristic, and wherein the computing device is configured to, in response to receiving the at least one communication, select the first software update based on the at least one desired characteristic.

15. A system comprising:
at least one processor; and
memory containing instructions configured to instruct the at least one processor to:
receive, via wireless transmission, a first software update from a first source;
store the first software update in a first memory;
determine a cryptographic measurement of the first software update;
determine, based on the cryptographic measurement, whether to accept or reject the first software update;
in response to determining to reject the first software update, enter a rescue mode to obtain a second software update from a second source; and
determine authenticity of the second software update by calculating a digest using a message authentication code, wherein the second software update and a secret key are inputs to the message authentication code, and wherein the secret key is stored in memory.

16. The system of claim 15, wherein the instructions are further configured to instruct the at least one processor to, in response to determining to reject the first software update, update at least a portion of software stored in system memory.

17. The system of claim 15, wherein a computer program corresponding to the second software update is stored in system memory, and wherein the instructions are further configured to instruct the at least one processor to, in response to determining to accept the second software update, execute the computer program.

18. The system of claim 15, wherein the rescue mode comprises loading rescue mode code from a boot device into an application controller, and executing, by the application controller, the rescue mode code to obtain the second software update.

19. The system of claim 15, wherein the rescue mode comprises executing, by a boot device, rescue mode code to obtain the second software update from the second source.

* * * * *